(12) United States Patent
Lev

(10) Patent No.: US 7,508,954 B2
(45) Date of Patent: Mar. 24, 2009

(54) SYSTEM AND METHOD OF GENERIC SYMBOL RECOGNITION AND USER AUTHENTICATION USING A COMMUNICATION DEVICE WITH IMAGING CAPABILITIES

(75) Inventor: Zvi Haim Lev, Tel Aviv (IL)

(73) Assignee: DSPV, Ltd., Tel Aviv (IL)

( * ) Notice: Subject to any disclaimer, the term of this patent is extended or adjusted under 35 U.S.C. 154(b) by 21 days.

(21) Appl. No.: 11/779,773

(22) Filed: Jul. 18, 2007

(65) Prior Publication Data

US 2008/0013832 A1 Jan. 17, 2008

Related U.S. Application Data

(63) Continuation of application No. 11/293,300, filed on Dec. 5, 2005, now Pat. No. 7,263,205.

(60) Provisional application No. 60/632,953, filed on Dec. 6, 2004.

(51) Int. Cl.
*G06K 9/00* (2006.01)
*H04L 9/00* (2006.01)

(52) U.S. Cl. .................. 382/100; 382/232; 380/51; 713/176

(58) Field of Classification Search .................. 382/100, 382/209, 217, 218, 232; 380/51, 54; 713/176
See application file for complete search history.

(56) References Cited

U.S. PATENT DOCUMENTS

| | | | |
|---|---|---|---|
| 4,779,095 A | 10/1988 | Guerreri | |
| 5,579,471 A | 11/1996 | Barber et al. | |
| 5,737,438 A | 4/1998 | Zlotnick et al. | |
| 5,926,116 A | 7/1999 | Kitano et al. | |
| 6,055,536 A | 4/2000 | Shimakawa et al. | |
| 6,181,817 B1 | 1/2001 | Zabih et al. | |
| 6,286,036 B1 | 9/2001 | Rhoads | |
| 6,393,147 B2 | 5/2002 | Danneels et al. | |
| 6,687,697 B2 | 2/2004 | Collins-Thompson et al. | |
| 6,738,512 B1 | 5/2004 | Chen et al. | |
| 6,753,883 B2 | 6/2004 | Schena et al. | |
| 6,766,363 B1 | 7/2004 | Rothschild | |
| 6,947,571 B1 | 9/2005 | Rhoads et al. | |
| 2002/0006212 A1 | 1/2002 | Rhoads et al. | |
| 2002/0019784 A1 | 2/2002 | Ritz | |
| 2002/0023218 A1 | 2/2002 | Lawandy et al. | |

(Continued)

*Primary Examiner*—Aaron W Carter
(74) *Attorney, Agent, or Firm*—Sughrue Mion, PLLC

(57) ABSTRACT

A system and method for recognizing symbols and identifying users or services, including the displaying of an image or video clip on a display device in which identification information is embedded in the image or video clip, the capturing the image or video clip on an imaging device, the transmitting of the image or video clip from the imaging device to a communication network, the transmitting of the image or video clip from the communication network to a processing and authentication server, the processing of the information embedded in the image or video clip by the server to identify logos, alphanumeric characters, or special symbols in the image or video clip, and converting the identified logos or characters or symbols into a digital format to identify the user or location of the user or service provided to the user, and the using of the processed information in digital format to provide one or more of a variety of additional applications.

64 Claims, 9 Drawing Sheets

U.S. PATENT DOCUMENTS

| | | |
|---|---|---|
| 2002/0055957 A1 | 5/2002 | Ohsawa |
| 2002/0102966 A1 | 8/2002 | Lev et al. |
| 2002/0103813 A1 | 8/2002 | Frigon |
| 2002/0140988 A1 | 10/2002 | Cheatle et al. |
| 2002/0156866 A1 | 10/2002 | Schneider |
| 2003/0012562 A1 | 1/2003 | Lawandy et al. |
| 2003/0072467 A1 | 4/2003 | Brundage et al. |
| 2004/0128512 A1 | 7/2004 | Sharma et al. |
| 2004/0208372 A1 | 10/2004 | Boncyk et al. |
| 2005/0004897 A1 | 1/2005 | Lipson et al. |
| 2005/0015311 A1 | 1/2005 | Frantz et al. |

SYSTEM AND METHOD OF GENERIC SYMBOL RECOGNITION AND USER AUTHENTICATION USING A COMMUNICATION DEVICE WITH IMAGING CAPABILITIES

CROSS-REFERENCE TO RELATED APPLICATIONS

This application is a continuation of application Ser. No. 11/293,300, filed Dec. 5, 2005, entitled "System and method of Generic Symbol Recognition and User Authentication using a Communication Device with Imaging Capabilities," which claims benefit of U.S. Provisional Application No. 60/632,953, filed on Dec. 6, 2004, entitled, "System and Method of Identifying a User Viewing Content on a Screen Using a Cellular/Wireless Device with Imaging Capabilities." The entire disclosures of these prior applications are considered part of the disclosure of this application and are hereby incorporated by reference.

BACKGROUND OF THE INVENTION

1. Field of the Invention

The present invention relates generally to the field of digital imaging, digital image recognition, and utilization of image recognition to applications such as authentication and access control. The device utilized for the digital imaging is a portable wireless device with imaging capabilities.

The invention utilizes an image of a display showing specific information which may be open (that is clear) or encoded. The imaging device captures the image on the display, and a computational facility will interpret the information (including prior decoding of encoded information) to recognize the image. The recognized image will then be used for purposes such as user authentication, access control, expedited processes, security, or location identification.

Throughout this invention, the following definitions apply:

"Computational facility" means any computer, combination of computers, or other equipment performing computations, that can process the information sent by the imaging device. Prime examples would be the local processor in the imaging device, a remote server, or a combination of the local processor and the remote server.

"Displayed" or "printed", when used in conjunction with an object to be recognized, is used expansively to mean that the object to be imaged is captured on a physical substance (as by, for example, the impression of ink on a paper or a paper-like substance, or by engraving upon a slab of stone), or is captured on a display device (such as LED displays, LCD displays, CRTs, plasma displays, or cell phone displays).

"Image" means any image or multiplicity of images of a specific object, including, for example, a digital picture, a video clip, or a series of images.

"Imaging device" means any equipment for digital image capture and sending, including, for example, a PC with a webcam, a digital camera, a cellular phone with a camera, a videophone, or a camera equipped PDA.

"Trusted" means authenticated, in the sense that "A" trusts "B" if "A" believes that the identity of "B" is verified and that this identity holder is eligible for the certain transactions that will follow. Authentication may be determined for the device that images the object, and for the physical location of the device based on information in the imaged object.

2. Description of the Related Art

There exist a host of well documented methods and systems for applications involving mutual transfer of information between a remote facility and a user for purposes such as user authentication, identification, or location identification. Some examples are:

1. Hardware security tokens such as wireless smart cards, USB tokens, Bluetooth tokens/cards, and electronic keys, that can interface to an authentication terminal (such as a PC, cell phone, or smart card reader). In this scheme, the user must carry these tokens around and use them to prove the user's identity. In the information security business, these tokens are often referred to as "something you have". The tokens can be used in combination with other security factors, such as passwords ("something you know") and biometric devices ("something you are") for what is called "multiple factor authentication". Some leading companies in the business of hardware security tokens include RSA Security, Inc., Safenet, Inc., and Aladdin, Inc.

2. The utilization of a mobile phone for authentication and related processes (such as purchase or information retrieval), where the phone itself serves as the hardware token, and the token is verified using well known technology called "digital certificate" or "PKI technology". In this case, the authentication server communicates with the CPU on the phone to perform challenge-response authentication sequences. The phone can be used both for the identification of the user, and for the user to make choices regarding the service or content he wishes to access. For example, this authentication method is used in the WAP browsers of some current day phones via digital certificates internal to the phone, to authenticate the WAP site and the phone to each other.

3. Authentication by usage of the cellular networks' capability to reliably detect the phone number (also called the "MSISDN") and the phone hardware number (also called the "IMEI") of a cellular device. For example, suppose an individual's MSISDN number is known to be +1-412-333-942-1111. That individual can call a designated number and, via an IVR system, type a code on the keypad. In this case, cellular network can guarantee with high reliability that the phone call originated from a phone with this particular MSISDN number—hence from the individual's phone. Similar methods exist for tracing the MSISDN of SMS messages sent from a phone, or of data transmission (such as, for example, Wireless Session Protocol "WSP" requests).

These methods and systems can be used for a wide variety of applications, including:

1. Access control for sensitive information or for physical entrance to sensitive locations.

2. Remote voting to verify that only authorized users can vote, and to ensure that each user votes only once (or up to a certain amount of times as permitted). Such usage is widespread currently in TV shows, for example, in rating a singer in a contest.

3. Password completion. There exist web sites, web services and local software utilities, that allow a user to bypass or simplify the password authorization mechanism when the user has a hardware token.

4. Charging mechanism. In order to charge a user for content, the user's identity must be reliably identified. For example, some music and streaming video services use premium SMS sent by the user to a special number to pay for the service—the user is charged a premium rate for the SMS, and in return gets the service or content. This mechanism relies on the reliability of the MSISDN number detection by the cellular network.

Although there are a multitude of approaches to providing authentication or authenticated services, these approaches have several key shortcomings, which include:

1. Cost and effort of providing tokens. Special purpose hardware tokens cost money to produce, and additional money to send to the user. Since these tokens serve only the purpose of authentication, they tend to be lost, forgotten or transferred between people. Where the tokens are provided by an employer to an employee (which is frequently but not always the specific use of such tokens), the tokens are single purpose devices provided to the employee with no other practical benefits to the employee (as compared to, for example, cellular phones which are also sometimes provided by the employer but which serve the employee for multiple purposes). It is common for employees to lose tokens, or forget them when they travel. For all of these reasons, hardware tokens, however they are provided and whether or not provided in an employment relationship, need to be re-issued often. Any organization sending out or relying upon such tokens must enforce token revocation mechanisms and token re-issuance procedures. The organization must spend money on the procedures as well as on the procurement and distribution of new tokens.

2. Limited flexibility of tokens. A particular token typically interface only to a certain set of systems and not to others— for example, a USB token cannot work with a TV screen, with a cellular phone or with any Web terminal/PC that lacks external USB access.

3. Complexity. The use of cellular devices with SMS or IVR mechanisms is typically cumbersome for users in many circumstances. The users must know which number to call, and they need to spend time on the phone or typing in a code. Additionally, when users must choose one of several options (e.g., a favorite singer out of a large number of alternatives) the choice itself by a numeric code could be difficult and error prone—especially if there are many choices. An implementation which does not currently exist but which would be superior, would allow the user to direct some pointing device at the desired option and press a button, similar to what is done in the normal course of web browsing.

4. Cost of service. Sending a premium SMS or making an IVR call is often more expensive than sending data packets (generally more expensive even than sending data packets of a data-rich object such as a picture).

5. Cost of service enablement. Additionally, the service provider must acquire from the cellular or landline telecom operator, at considerable expense, an IVR system to handle many calls, or a premium SMS number.

6. Difficulty in verification of user physical presence. When a user uses a physical hardware token in conjunction with a designated reader, or when the user types a password at a specific terminal, the user's physical presence at that point in time at that particular access point is verified merely by the physical act. The current scheme does not require the physical location of the sending device, and is therefore subject to user counterfeiting. For example, the user could be in a different location altogether, and type an SMS or make a call with the information provided to the user by someone who is at the physical location. (Presumably the person at the physical location would be watching the screen and reporting to the user what to type or where to call.) Thus, for example, in SMS based voting, users can "vote" to their favorite star in a show without actually watching the show. That is not the declared intention of most such shows, and defeats the purpose of user voting.

SUMMARY OF THE INVENTION

The present invention presents a method and system of enabling a user with an imaging device to conveniently send digital information appearing on a screen or in print to a remote server for various purposes related to authentication or service request.

The invention presents, in an exemplary embodiment, capturing an image of a printed object, transmitting the image to a remote facility, pre-processing the image in order to optimize the recognition results, searching the image for alphanumeric characters or other graphic designs, and decoding said alphanumeric characters and identification of the graphic designs from an existing database.

The invention also presents, in an exemplary embodiment, the utilization of the image recognition results of the image (that is, the alphanumeric characters and/or the graphic designs of the image) in order to facilitate dynamic data transmission from a display device to an imaging device. Thus, information can be displayed on the screen, imaged via the imaging device, and decoded into digital data. Such data transmission can serve any purpose for which digital data communications exist. In particular, such data transmission can serve to establish a critical data link between a screen and the user's trusted communication device, hence facilitating one channel of the two channels required for one-way or mutual authentication of identity or transmission of encrypted data transmission.

The invention also presents, in an exemplary embodiment, the utilization of the image recognition results of the image in order to establish that the user is in a certain place (that is, the place where the specific object appearing in the image exists) or is in possession of a certain object.

The invention also presents, in an exemplary embodiment a new and novel algorithm, which enables the reliable recognition of virtually any graphic symbol or design, regardless of size or complexity, from an image of that symbol taken by a digital imaging device. Such algorithm is executed on any computational facility capable of processing the information captured and sent by the imaging device.

BRIEF DESCRIPTION OF THE DRAWINGS

Various other objects, features and attendant advantages of the present invention will become fully appreciated as the same become better understood when considered in conjunction with the accompanying detailed description, the appended claims, and the accompanying drawings, in which:

DETAILED DESCRIPTION OF THE PREFERRED EMBODIMENTS

Figure 1:
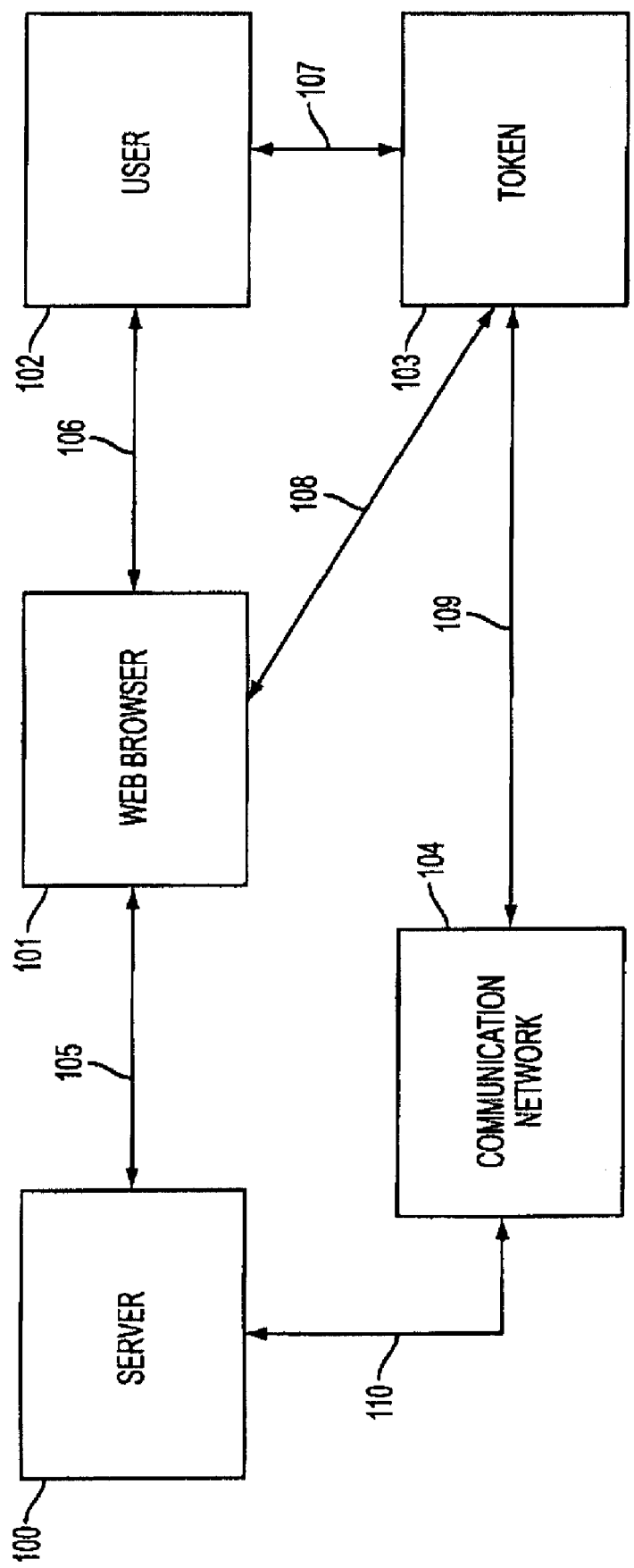
FIG. 1 is a block diagram of a prior art communication system for establishing the identity of a user and facilitating transactions.

This invention presents an improved system and method for user interaction and data exchange between a user equipped with an imaging device and some server/service.

The system includes the following main components:

A communication imaging device (wireless or wireline), such as a camera phone, a webcam with a WiFi interface, or a PDA (which may have a WiFi or cellular card). The device is capable of taking images, live video clips, or off-line video clips.

Client software on the device enabling the imaging and the sending of the multimedia files to a remote server. This software can be embedded software which is part of the device, such as an email client, or an MMS client, or an H.324 video telephony client. Alternatively, the software can be downloaded software, either generic software such as blogging software (e.g., the Picoblogger™ product by Picostation™, or the Cognima Snap™ product by Cognima™, Inc.), or special software designed specifically and optimized for the imaging and sending operations.

A remote server with considerable computational resources or considerable memory. "Considerable computational resources" in this context means that this remote server can perform calculations faster than the local CPU of the imaging device by at least one order of magnitude. Thus the user's wait time for completion of the computation is much smaller when such a remote server is employed. "Considerable memory" in this context means that the server has a much larger internal memory (the processor's main memory or RAM) than the limited internal memory of the local CPU of the imaging device. The remote server's considerable memory allows it to perform calculations that the local CPU of the imaging device cannot perform due to memory limitations of the local CPU. The remote server in this context will have considerable computational resources, or considerable memory, or both.

A display device, such as a computer screen, cellular phone screen, TV screen, DVD player screen, advertisement board, or LED display. Alternatively, the display device can be just printed material, which may be printed on an advertisement board, a receipt, a newspaper, a book, a card, or other physical medium.

The method of operation of the system may be summarized as follows:

The display device shows an image or video clip (such as a login screen, a voting menu, or an authenticated purchase screen) that identifies the service, while also showing potentially other content (such as an ongoing TV show, or preview of a video clip to be loaded.).

The user images the display with his portable imaging device, and the image is processed to identify and decode the relevant information into a digital string. Thus, a de-facto one way communication link is established between the display device and the user's communication device, through which digital information is sent.

The information decoded in the previous stage is used for various purposes and applications, such as for example two way authentication between the user and the remote service.

FIG. 1 illustrates a typical prior art authentication system for remote transactions. A server 100 which controls access to information or services, controls the display of a web browser 101 running in the vicinity of the user 102. The user has some trusted security token 103. In some embodiments, the token 103 is a wireless device that can communicate through a communication network 104 (which may be wireless, wireline, optical, or any other network that connects two or more non-contiguous points). The link 105 between the server the web browser is typically a TCP/IP link. The link 106 between the web browser and the user is the audio/visual human connectivity between the user and the browser's display. The link 107 between the user and the token denotes the user-token interface, which might be a keypad, a biometric sensor, or a voice link. The link 108 between the token and the web browser denotes the token's interaction channel based on infra red, wireless, physical electric connection, acoustic, or other methods to perform a data exchange between the token 103 and the web browsing device 101. The link 109 between the token and the wireless network can be a cellular interface, a WiFi interface, a USB connector, or some other communication interface. The link 110 between the communication network and the server 100 is typically a TCP/IP link.

The user 102 reads the instructions appearing on the related Web page on browser 101, and utilizes some authentication token 103 in order to validate the user's identity and/or the identity and validity of the remote server 100. The token can be, for example, one of the devices mentioned in the Description of the Related Art, such as a USB token, or a cellular phone. The interaction channel 107 of the user with the token can involve the user typing a password at the token, reading a numeric code from the token's screen, or performing a biometric verification through the token. The interaction between the token 103 and the browser 101 is further transferred to the remote server 100 for authentication (which may be performed by comparison of the biometric reading to an existing database, password verification, or cryptographic verification of a digital signature). The transfer is typically done through the TCP/IP connection 105 and through the communication network 104.

The key factor enabling the trust creation process in the system is the token 103. The user does not trust any information coming from the web terminal 101 or from the remote server 100, since such information may have been compromised or corrupted. The token 103, carried with the user and supposedly tamper proof, is the only device that can signal to the user that the other components of the system may be trusted. At the same time, the remote server 100 only trusts information coming from the token 103, since such information conforms to a predefined and approved security protocol. The token's existence and participation in the session is considered a proof of the user's identity and eligibility for the service or information (in which "eligible" means that the user is a registered and paying user for service, has the security clearance, and meets all other criteria required to qualify as a person entitled to receive the service).

In the embodiments where the token 103 is a mobile device with wireless data communication capabilities, the communication network 104 is a wireless network, and may be used to establish a faster or more secure channel of communication between the token 103 and the server 100, in addition to or instead of the TCP/IP channel 105. For example, the server 100 may receive a call or SMS from the token 103, where wireless communication network 104 reliably identifies for the server the cellular number of the token/phone. Alternatively, the token 103 may send an inquiry to the wireless communication network 104 as to the identity and eligibility of the server 100.

A key element of the prior art are thus the communication links 106, 107, and 108, between the web browser 101, the user 102, and the token 103. These communication links require the user to manually read and type information, or alternatively require some form of communication hardware in the web browser device 101 and compatible communication hardware in the token 103.

Figure 2:
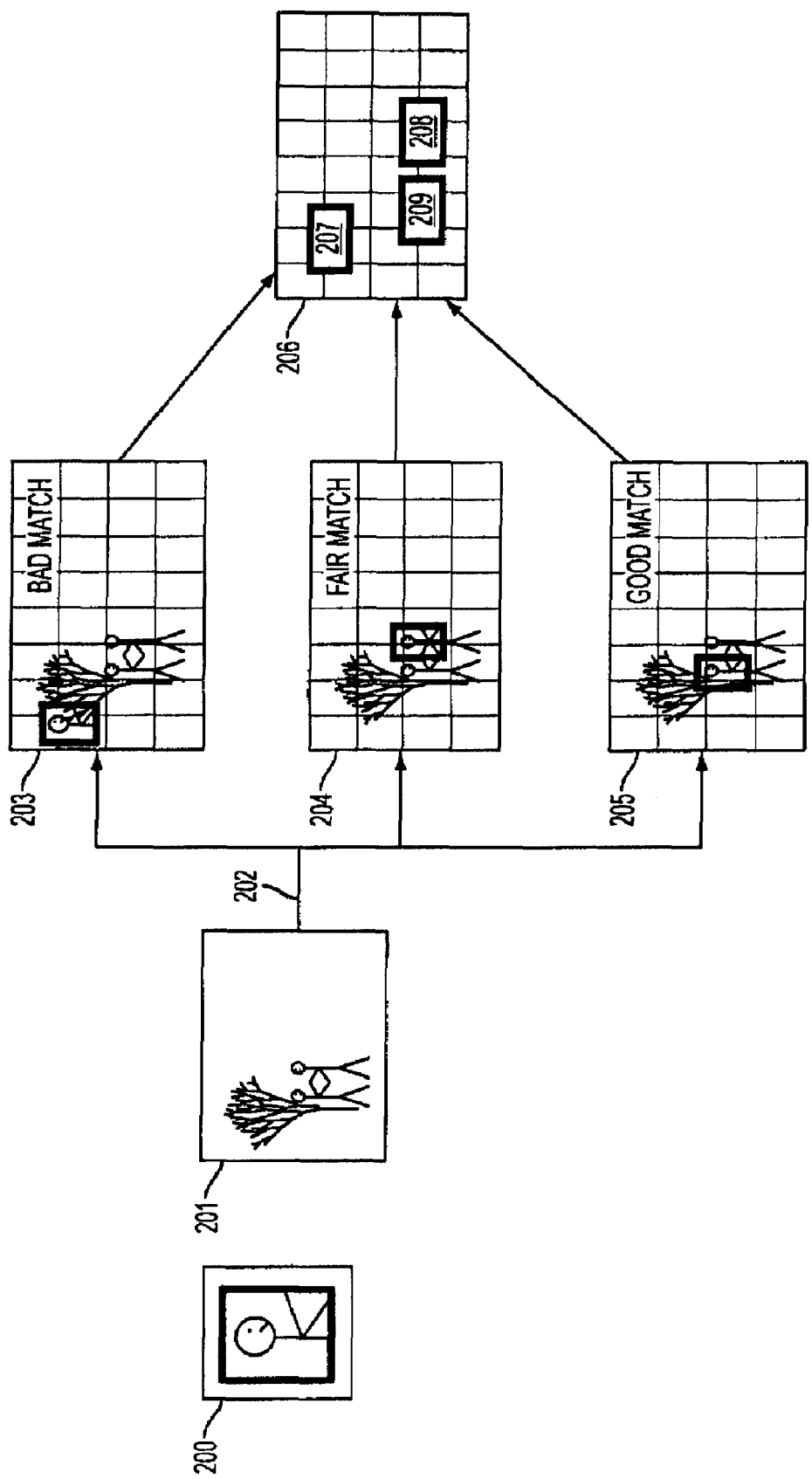
FIG. 2 is a flowchart diagram of a typical method of image recognition for a generic two-dimensional object.

FIG. 2 illustrates a typical prior art method of locating an object in a two-dimensional image and comparing it to a reference in order to determine if the objects are indeed identical. A reference template 200 (depicted in an enlarged view for clarity) is used to search an image 201 using the well known and established technology of "normalized cross correlation method" (also known as "NCC"). Alternatively, other similarity measures such as the "sum of absolute differences" ("SAD") and its variants may be used. The common denominator of all of these methods (NCC, SAD, and their variants) is that the methods get a fixed size template, compare that template to parts of the image 201 which are of identical size, and return a single number on some given scale where the magnitude of the number indicates whether or not there is a match between the template and the image. For example, a 1.0 would denote a perfect match and a 0.0 would indicate no match. Thus, if a "sliding window" of a size identical to the size of the template 200 is moved horizontally and vertically over the image 201, and the results of the comparison method—the "match values" (e.g. NCC, SAD) are registered for each position of the sliding window, a new "comparison results" image is created in which for each pixel the value is the result of the comparison of the area centered around this pixel in the image 201 with the template 200. Typically, most pixel locations in the image 201 would yield low match values. The resulting matches, determined by the matching operation 202 are displayed in elements 203, 204, and 205. In the example shown in FIG. 2, pixel location denoted in 203 (the center of the black square) has yielded a low match value (since the template and the image compared are totally dissimilar), pixel location denoted in 204 has yielded an intermediate match value (because both images include the faces and figures of people, although there is not a perfect match), and the pixel location denoted in 205 has yielded a high match value. Therefore, application of a threshold criterion to the resulting "match values" image generates image 206, where only in specific locations (here 207, 208, 209) is there a non-zero value. Thus, image 206 is not an image of a real object, but rather a two dimensional array of pixel values, where each pixel's value is the match. Finally, it should be noted that in the given example we would expect the value at pixel 209 to be the highest since the object at this point is identical to the template.

The prior art methods are useful when the image scale corresponds to the template size, and when the object depicted in the template indeed appears in the image with very little change from the template. However, if there is any variation between the template and the image, then prior art methods are of limited usefulness. For example, if the image scale or orientation are changed, and/or if the original object in the image is different from the template due to effects such as geometry or different lighting conditions, or if there are imaging optical effects such as defocusing and smearing, then in any of these cases the value at the pixel of the "best match" 209 could be smaller than the threshold or smaller than the value at the pixel of the original "fair match" 208. In such a case, there could be an incorrect detection, in which the algorithm has erroneously identified the area around location 208 as containing the object depicted in the template 200.

A further limitation of the prior art methods is that as the template 200 becomes larger (that is to say, if the object to be searched is large), the sensitivity of the match results to the effects described in the previous paragraph is increased. Thus, application of prior art methods is impractical for large objects. Similarly, since prior art methods lack sensitivity, they are less suitable for identification of graphically complicated images such as a complex graphical logo.

In typical imaging conditions of a user with an imaging device performing imaging of a screen or of printed material, the prior art methods fail for one or more of the deficiencies mentioned above. Thus, a new method and system are required to solve these practical issues, a method and system which are presented here as exemplary embodiments of the present invention.

Figure 3:
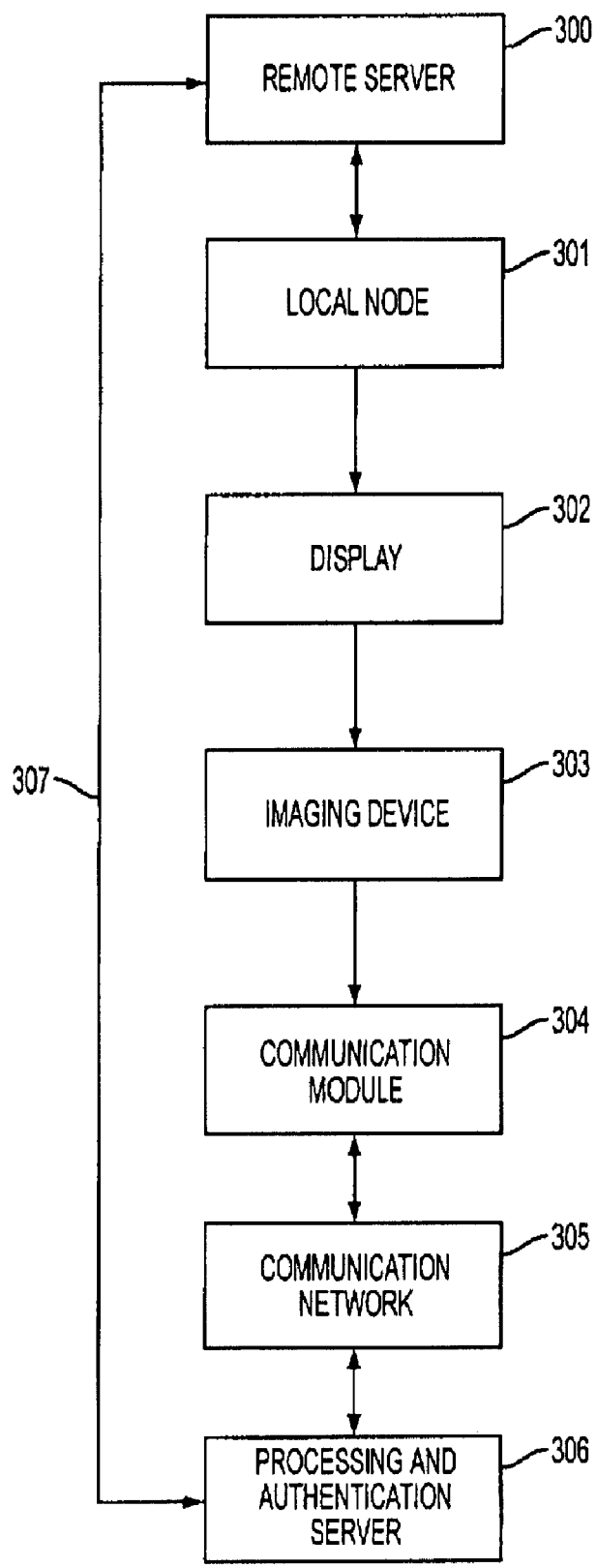
FIG. 3 is a block diagram of the different components of an exemplary embodiment of the present invention.

In FIG. 3, the main components of an exemplary embodiment of the present invention are described. As in the prior art described in FIG. 1, a remote server 300 is used. (Throughout this application, the term "remote server" 300 means any combination of servers or computers.) The remote server 300 is connected directly to a local node 301. (Throughout this application, the term "local node" 301 means any device capable of receiving information from the remote server and displaying it on a display 302.) Examples of local nodes include a television set, a personal computer running a web browser, an LED display, or an electronic bulletin board.

The local node is connected to a display 302, which may be any kind of physical or electronic medium that shows graphics or texts. In some embodiments, the local node 301 and display device 302 are a static printed object, in which case their only relation to the server 300 is off-line in the sense that the information displayed on 302 has been determined by or is known by the server 300 prior to the printing and distribution process. Examples of such a local node include printed coupons, scratch cards, or newspaper advertisements.

The display is viewed by an imaging device 303 which captures and transmits the information on the display. There is a communication module 304 which may be part of the imaging device 303 or which may be a separate transmitter, which sends the information (which may or may not have been processed by a local CPU in the imaging device 303 or in the communication module 304) through a communication network 305. In one embodiment, the communication network 305 is a wireless network, but the communication network may be also a wireline network, an optical network, a cable network, or any other network that creates a communication link between two or more nodes that are not contiguous.

The communication network 305 transmits the information to a processing and authentication server 306. The processing and authentication server 306 receives the transmission from the communication network 305 in whatever degree of information has been processed, and then completes the processing to identify the location of the display, the time the display was captured, and the identity of the imaging device (hence, also the service being rendered to the user, the identity of the user, and the location of the user at the time the image or video clip was captured by the imaging device). The processing and authentication server 306 may initiate additional services to be performed for the user, in which case there will be a communication link between that server 306 and server 300 or the local node 301, or between 306 and the communication module 304.

The exact level of processing that takes place at 304, 305, and 306 can be adapted to the desired performance and the utilized equipment. The processing activities may be allocated in any combination among 304, 305, and 306, depending on factors such as the processing requirements for the specific information, the processing capabilities of these three elements of the system, and the communication speeds between the various elements of the system. As an example, components 303 and 304 could be parts of a 3G phone making a video call through the a cellular network 305 to the server 306. In this example, video frames reach 306 and must be completely analyzed and decoded there, at server 306, to decode the symbols, alphanumerics and/or machine codes in the video frames. An alternative example would be a "smartphone" (which is a phone that can execute local software) running some decoding software, such that the communication module 304 (which is a smartphone in this example) performs symbol decoding and sends to server 306 a completely parsed digital string or even the results of some cryptographic decoding operation on that string.

In FIG. 3, a communication message has been transmitted from server 300 to the processing and authentication server 306 through the chain of components 301, 302, 303, 304, and 305. Thus, one key aspect of the current invention, as compared to the prior art depicted in FIG. 1, is the establishment of a new communication channel between the server 300 and the user's device, composed of elements 303 and 304. This new channel replaces or augments (depending on the application) the prior art communication channels 106, 107, and 108, depicted in FIG. 1.

Figure 4:
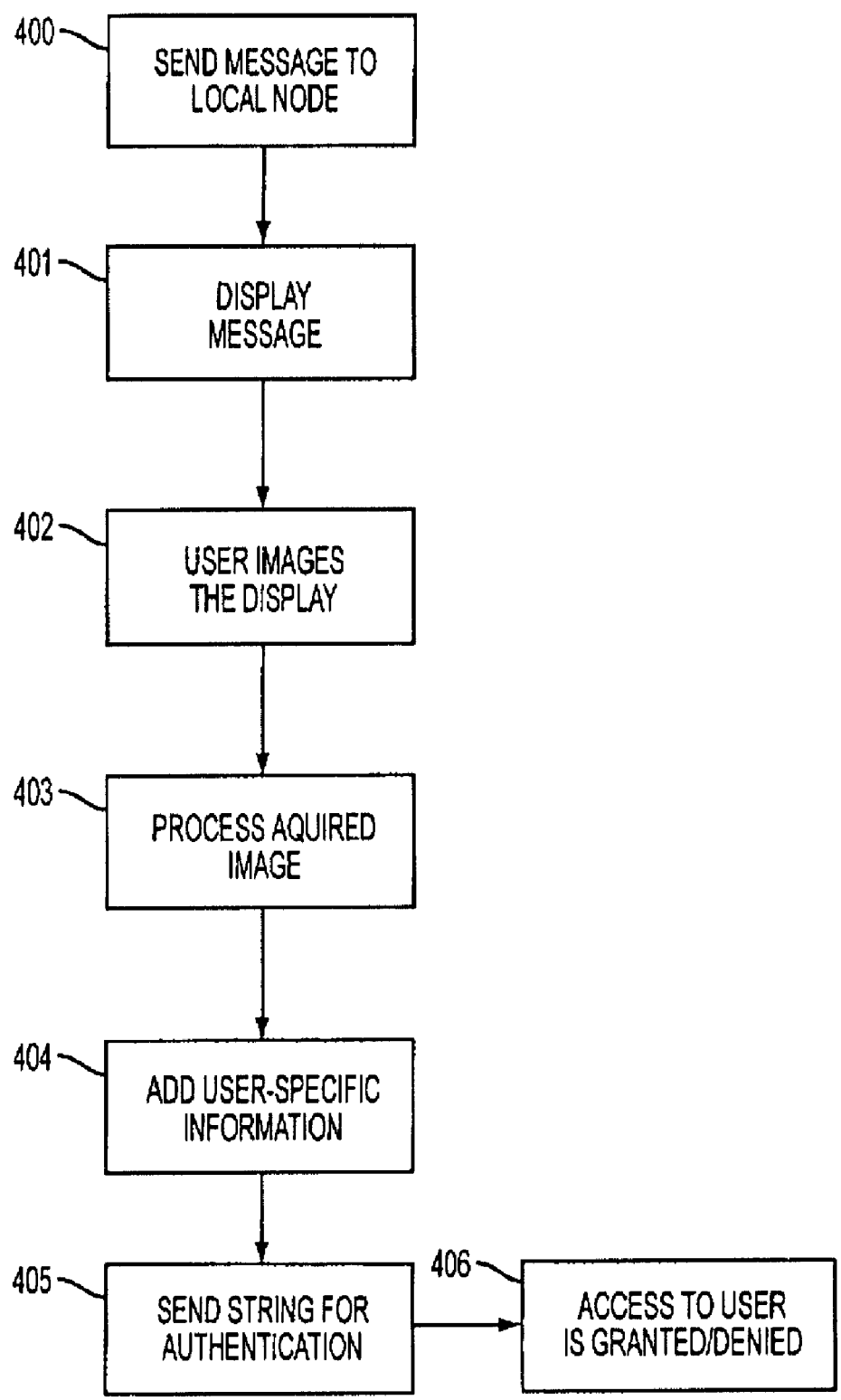
FIG. 4 is a flowchart diagram of a user authentication sequence according to one embodiment of the present invention.

In FIG. 4, a method of operative flow of a user authentication sequence is shown. In stage 400, the remote server 300 prepares a unique message to be displayed to a user who wishes to be authenticated, and sends that message to local node 301. The message is unique in that at a given time only one such exact message is sent from the server to a single local node. This message may be a function of time, presumed user's identity, the local node's IP address, the local node's location, or other factors that make this particular message singular, that is, unique. Stage 400 could also be accomplished in some instances by the processing and authentication server 306 without affecting the process as described here.

In stage 401, the message is presented on the display 302. Then, in stage 402, the user uses imaging device 303 to acquire an image of the display 302. Subsequently, in stage 403, this image is processed to recover the unique message displayed. The result of this recovery is some digital data string. Various examples of a digital data string could be an alphanumeric code which is displayed on the display 302, a URL, a text string containing the name of the symbol appearing on the display (for example "Widgets Inc. Logo"), or some combination thereof. This processing can take place within elements 304, 305, 306, or in some combination thereof.

In stage 404, information specific to the user is added to the unique message recovered in stage 403, so that the processing and authentication server 306 will know who is the user that wishes to be authenticated. This information can be specific to the user (for example, the user's phone number or MSISDN as stored on the user's SIM card), or specific to the device the user has used in the imaging and communication process (such as, for example, the IMEI of a mobile phone), or any combination thereof. This user-specific information may also include additional information about the user's device or location supplied by the communication network 305.

In stage 405, the combined information generated in stages 403 and 404 is used for authentication. In the authentication stage, the processing and authentication server 306 compares the recovered unique message to the internal repository of unique messages, and thus determines whether the user has imaged a display with a valid message (for example, a message that is not older than two days, or a message which is not known to be fictitious), and thus also knows which display and local node the user is currently facing (since each local node receives a different message). In stage 405, the processing and authentication server 306 also determines from the user's details whether the user should be granted access from this specific display and local node combination. For example, a certain customer of a bank may be listed for remote Internet access on U.S. soil, but not outside the U.S. Hence, if the user is in front of an access login display in Britain, access will not be granted. Upon completion of the authentication process in 405, access is either granted or denied in stage 406. Typically a message will be sent from server 306 to the user's display 302, informing the user that access has been granted or denied.

In order to clarify further the nature and application of the invention, it would be valuable to consider several examples of the manner in which this invention may be used. The following examples rely upon the structure and method as depicted in FIGS. 3 and 4:

Example 1 of using the invention is user authentication. There is displayed 401 on the display 302 a unique, time dependent numeric code. The digits displayed are captured 403, decoded (403, 404, 405, and 406), and sent back to remote server 300 along with the user's phone number or IP address (where the IP address may be denoted by "X"). The server 300 compares the decoded digital string (which may be denoted as "M") to the original digits sent to local node 301. If there is a match, the server 300 then knows for sure that the user holding the device with the phone number or IP address X is right now in front of display device 302 (or more specifically, that the imaging device owned or controlled by the user is right now in front of display device 302). Such a procedure can be implemented in prior art by having the user read the digits displayed by the web browser 101 and manually type them on the token 103. Alternatively in prior art, this information could be sent on the communication channel 108. Some of the advantages of the invention over prior art, is that the invention avoids the need for additional hardware and avoids also the need for the user to type the information. In the embodiment of the invention described herein, therefore, the transaction is faster, more convenient, and more reliable than the manner in which transaction is performed according to prior art. Without limitation, the same purpose accomplished here with alphanumeric information could be accomplished by showing on the display 302 some form of machine readable code or any other two-dimensional and/or time changing figure which can be compared to a reference figure. Using graphic information instead of alphanumerics has another important security advantage, in that another person (not the user) watching the same display from the side will not be able to write down, type, or memorize the information for subsequent malicious use. A similar advantage could be achieved by using a very long alphanumeric string.

Example 2 of using the invention is server authentication. The remote server 300 displays 401 on the display 302 a unique, time dependent numeric code. The digits displayed appear in the image captured 403 by imaging device 303 and are decoded by server 306 into a message M (in which "M" continues to be a decoded digital string). The server 306 also knows the user's phone number or IP address (which continues to be denoted by "X"). The server 306, has a trusted connection 307 with the server 300, and makes an inquiry to 300, "Did you just display message M on a display device to authenticated user X?" The server 300 sends transmits the answer through the communication network 305 to the processing and authentication server 306. If the answer is yes, the server 306 returns, via communication network 305, to the user on the trusted communication module 304 an acknowledgement that the remote server 300 is indeed the right one. A typical use of the procedure described here would be to prevent ip-address spoofing, or prevent pharming/phishing. "Spoofing" works by confusing the local node about the IP address to which the local node is sending information. "Pharming" and "Phishing" attacks work by using a valid domain name which is not the domain name of the original service, for example, by using www.widgetstrick.com instead of the legitimate service www.widgetsinc.com. All of these different attack schemes strive in the end to cause the user who is in front of local node 301 to send information and make operations while believing that the user is communicating with legitimate server 300 while in fact all the information is sent to a different, malicious server. Without limitation, the server identification accomplished here with alphanumeric information, could be accomplished by showing on the display 302 some form of machine readable code or any other two-dimensional and/or time changing figure which can be compared to a reference figure.

Example 3 of using the invention is coupon loading or scratch card activation. The application and mode of usage would be identical to Example 1 above, with the difference that the code printed on the card or coupon is fixed at the time of printing (and is therefore not, as in Example 1, a decoded digital string). Again, advantages of the present invention over prior art would be speed, convenience, avoidance of the potential user errors if the user had to type the code printed on the coupon/card, and the potential use of figures or graphics that are not easily copied.

Example 4 of using the invention is a generic accelerated access method, in which the code or graphics displayed are not unique to a particular user, but rather are shared among multiple displays or printed matter. The server 300 still receives a trusted message from 306 with the user identifier X and the decoded message M (as is described above in Examples 1 and 3), and can use the message as an indication that the user is front of a display of M. However, since M is shared by many displays or printed matters, the server 300 cannot know the exact location of the user. In this example, the exact location of the user is not of critical importance, but quick system access is of importance. Various sample applications would be content or service access for a user from a TV advertisement, or from printed advertisements, or from a web page, or from a product's packaging. One advantage of the invention is in making the process simple and convenient for the user, avoiding a need for the user to type long numeric codes, or read complex instructions, or wait for an acknowledgment from some interactive voice response system. Instead, in the present invention the user just takes a picture of the object 403, and sends the picture somewhere else unknown to the user, where the picture will be processed in a manner also unknown to the user, but with quick and effective system access.

As can be understood from the discussion of FIGS. 3 and 4, one aspect of the present invention is the ability of the processing software in 304 and/or 306 to accurately and reliably decode the information displayed 401 on the display device 302. As has been mentioned in the discussion of FIG. 2, prior art methods for object detection and recognition are not necessarily suitable for this task, in particular in cases where the objects to be detected are extended in size and/or when the imaging conditions and resolutions are those typically found in portable or mobile imaging devices.

Figure 5:
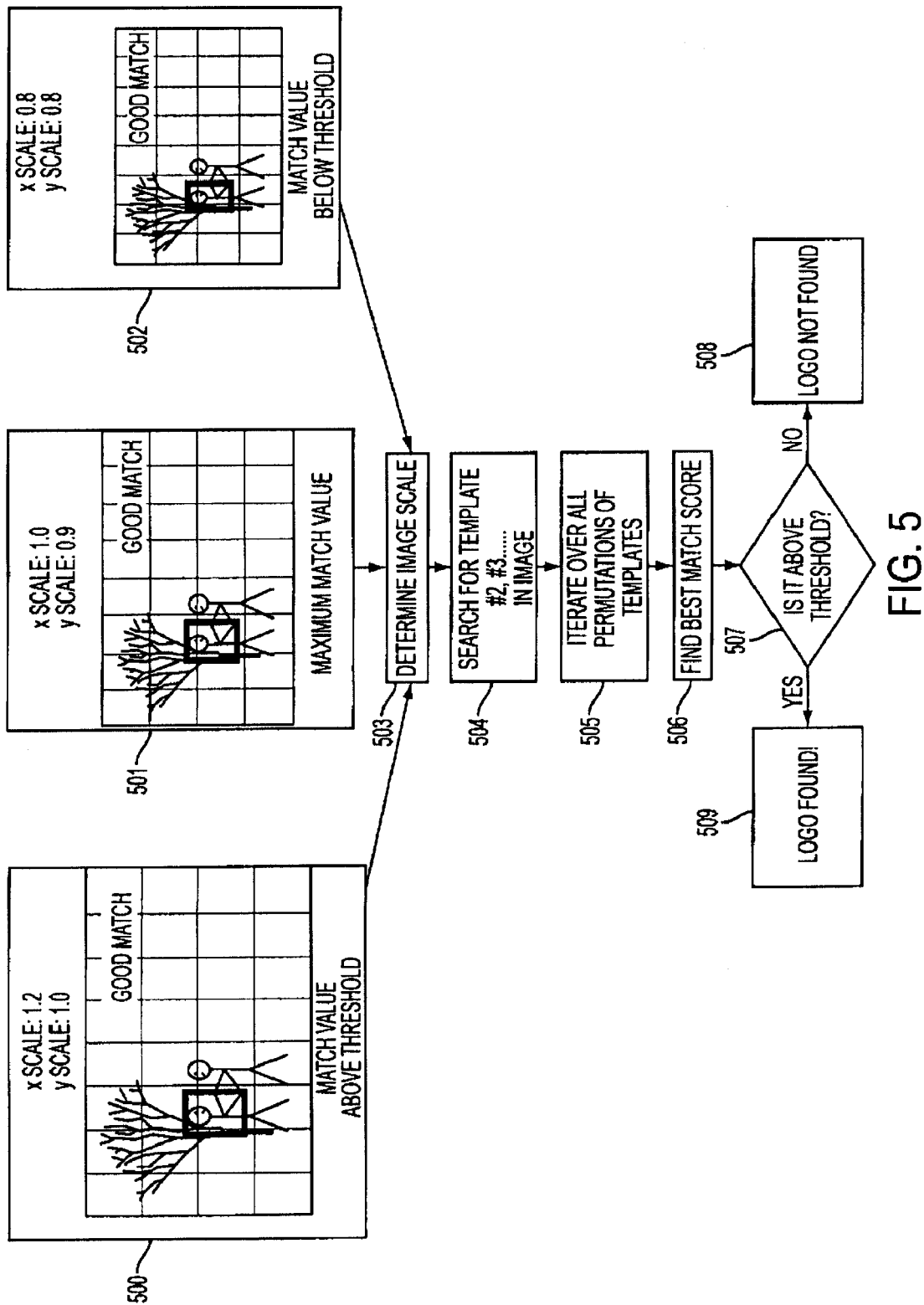
FIG. 5 is a flow chart diagram of the processing flow used by the processing and authentication server in the system in order to determine whether a certain two-dimensional object appears in the image.

FIG. 5 illustrates some of the operating principles of one embodiment of the invention. A given template, which represents a small part of the complete object to be searched in the image, is used for scanning the complete target image acquired by the imaging device 303. The search is performed on several resized versions of the original image, where the resizing may be different for the X,Y scale. Each combination of X,Y scales is given a score value based on the best match found for the template in the resized image. The algorithm used for determining this match value is described in the description of FIG. 6 below.

The scaled images 500, 501, and 502, depict three potential scale combinations for which the score function is, respectively, above the minimum threshold, maximal over the whole search range, and below the minimum threshold. Element 500 is a graphic representation in which the image has been magnified by 20% on the y-scale. Hence, in element 500 the x-scale is 1.0 and y-scale is 1.2. The same notation applies for element 501 (in which the y-scale is 0.9) and element 502 (in which each axis is 0.8). These are just sample scale combinations used to illustrate some of the operating principles of the embodiment of the invention. In any particular transaction, any number and range of scale combinations could be used, balancing total run time on the one hand (since more scale combinations require more time to search) and detection likelihood on the other hand (since more scale combinations and a wider range of scales increase the detection probability).

Accordingly, in stage 503 the optimal image scale (which represents the image scale at which the image's scale is closest to the template's scale) is determined by first searching among all scales where the score is above the threshold (hence element 502 is discarded from the search, while elements 500 and 501 are included), and then choosing 501 as the optimal image scale. Alternatively, the optimal image scale may be determined by other score functions, by a weighting of the image scales of several scale sets yielding the highest scores, and/or by some parametric fit to the whole range of scale sets based on their relative scores. In addition to searching over a range of image scales for the X and Y axes, the search itself could be extended to include image rotation, skewing, projective transformations, and other transformations of the template.

In stage 504, the same procedure performed for a specific template in stage 503 is repeated for other templates, which represent other parts of the full object. The scale range can be identical to that used in 503 or can be smaller, as the optimal image scale found in stage 503 already gives an initial estimate to the optimal image scale. For example, if at stage 503 the initial search was for X and Y scale values between 0.5 to 1.5, and the optimal scale was at X=1.0, Y=0.9, then the search in stage 504 for other templates may be performed at a tighter scale range of between 0.9 and 1.1 for both the X and Y scales.

It is important to note that even at an "optimal scale" for a given template search, there may be more than one candidate location for that template in the image. A simple example can be FIG. 2. Although the best match is in element 205, there is an alternative match in element 204. Thus, in the general case, for every template there will be several potential locations in the image even in the selected "optimal scale". This is because several parts of the image may be sufficiently similar to the template to yield a sufficiently high match value.

Figure 6:
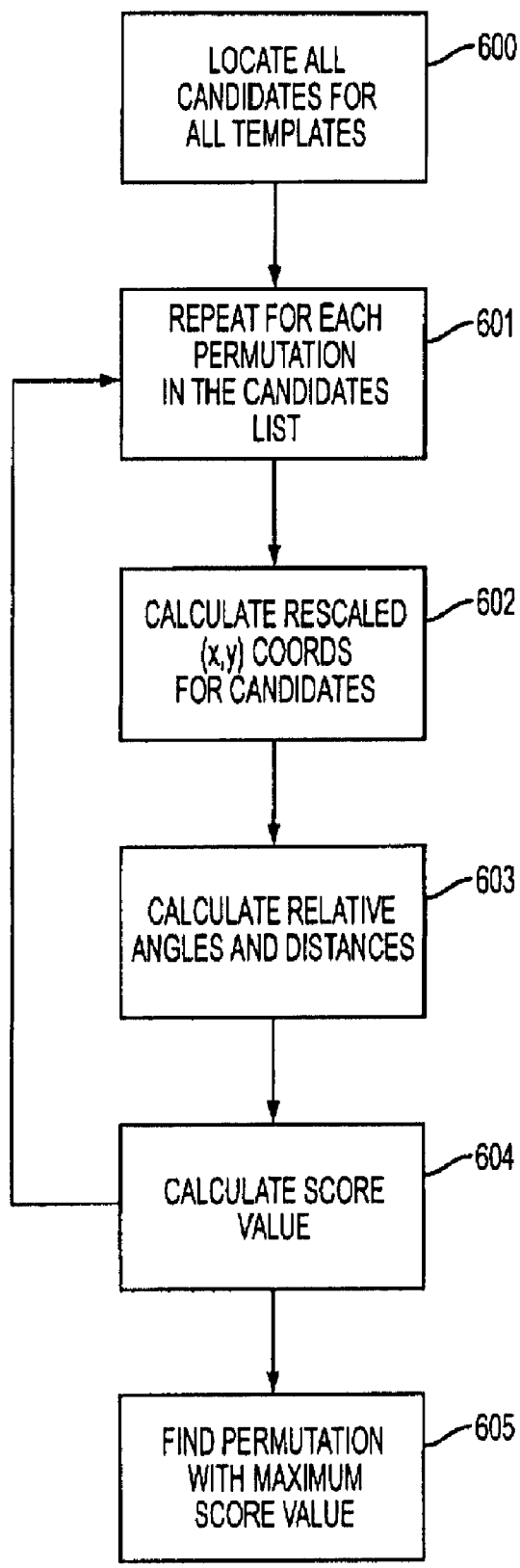
FIG. 6 is a flow chart diagram showing the determination of the template permutation with the maximum score value, according to one embodiment of the present invention.
Figure 7:
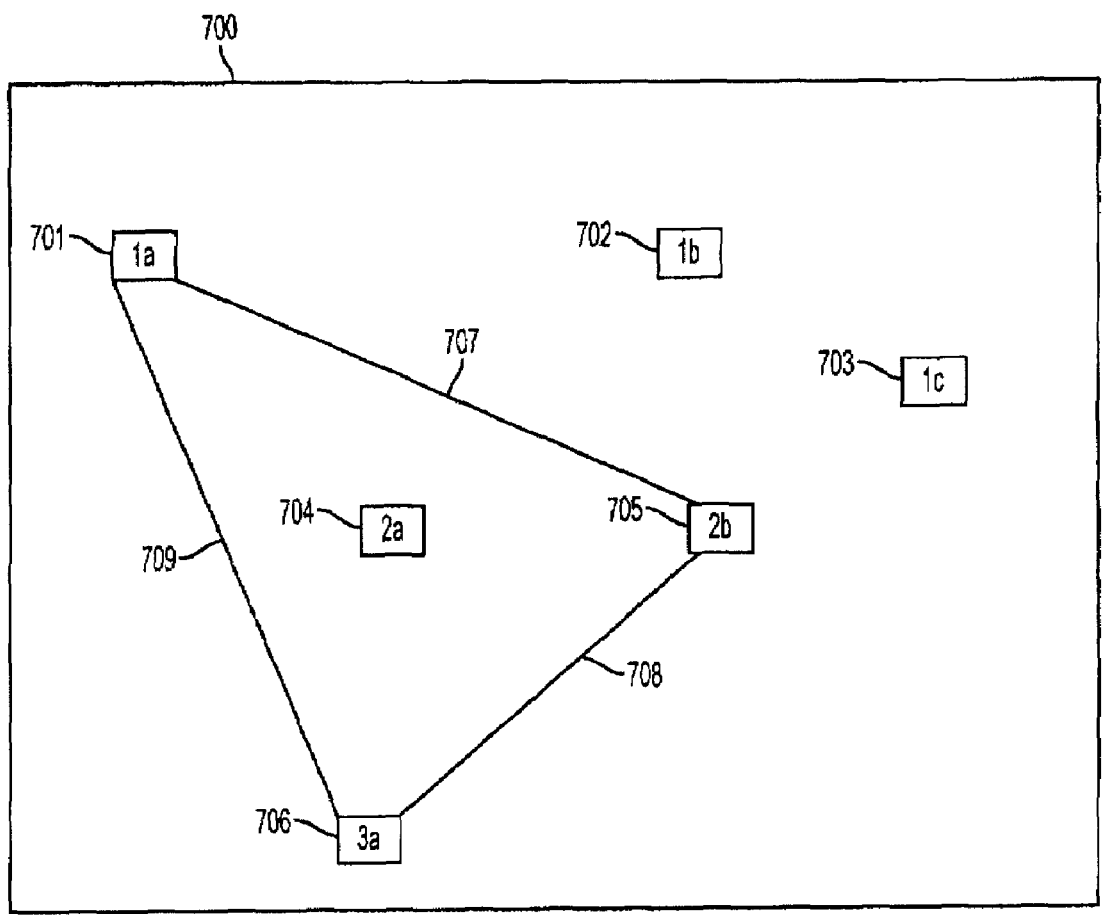
FIG. 7 is a diagram of the final result of a determination of the template permutation with the maximum score value, according to one embodiment of the present invention.

In stage 505, the different permutations of the various candidates are considered to determine whether the complete object is indeed in the image. (This point is further explained in FIG. 6 and FIG. 7.) Hence, if the object is indeed in the image, all of these templates should appear in the image with similar relative positions between them. Some score function, further explained in the discussion of FIGS. 6 and 7, is used to rate the relative likelihood of each permutation, and a best match (highest score) is chosen in stage 506. Various score functions can be used, such as, for example, allowing for some template candidates to be missing completely (e.g., no candidate for template number 3 has been located in the image).

In stage 507 the existence of the object in the image is determined by whether best match found in stage 506 has met exceeded some threshold match. If the threshold match has been met or exceeded, the a match is found and the logo (or other information) is identified 509. If the threshold is not met, then the match has not been found 508, and the process must be repeated until a match is found.

There are some important benefits gained by searching for various sub-parts of the complete object instead of directly searching for the complete object as is done in prior art.

For Example:
Parts of the object may be occluded, shadowed, or otherwise obscured, but nevertheless, as long as enough of the sub-templates are located in the image, the object's existence can be determined and identified.

By searching for small parts of the object rather than for the whole object, the sensitivity of the system to small scale variations, lighting non-uniformity, and other geometrical and optical effects, is greatly reduced. For example, consider an object with a size of 200 by 200 pixels. In such an image, even a 1% scale error/difference between the original object and the object as it appears in the image could cause a great reduction in the match score, as it reflects a change in size of 2 pixels. At the same time, sub-templates of the full object, at a size of 20 by 20 pixels each, would be far less sensitive to a 1% scale change.

A graphic object may include many areas of low contrast, or of complex textures or repetitive patterns. Such areas may yield large match values between themselves and shifted, rotated or rescaled versions of themselves. This will confuse most image search algorithms. At the same time, such an object may contain areas with distinct, high contrast patterns (such as, for example, an edge, or a symbol). These high contrast, distinct patterns would serve as good templates for the search algorithm, unlike the fuzzy, repetitive or low contrast areas. Hence, the present invention allows the selection of specific areas of the object to be searched, which greatly increases the precision of the search.

By searching for smaller templates instead of the complete object as a single template, the number of computations is significantly reduced. For example, a normalized cross correlation search for a 200 by 200 pixel object would be more than 100 times more computationally intensive than a similar normalized cross correlations search for a 20 by 20 sub template of that object.

FIGS. 6 and 7 illustrate in further detail the internal process of element 505. In stage 600, all candidates for all templates are located and organized into a properly labeled list. As an example, in a certain image, there may be 3 candidates for template #1, which are depicted graphically in FIG. 7, within 700. The candidates are, respectively, 701 (candidate a for template #1, hence called 1a), 702 (candidate b for template #1, hence called 1b), and 703 (candidate c for template #1, hence called 1c). These candidates are labeled as 1a, 1b, and 1c, since they are candidates of template #1 only. Similarly 704 and 705 denote candidate locations for template #2 in the same image which are hence properly labeled as 2a and 2b. Similarly for template #3, in this example only one candidate location 706 has been located and labeled as 3a. The relative location of the candidates in the figure correspond to their relative locations in the original 2D image.

In stage 601, an iterative process takes place in which each permutation containing exactly one candidate for each template is used. The underlying logic here is the following: if the object being searched indeed appears in the image, then not only should the image include templates 1, 2, and 3, but in addition it should also include them with a well defined, substantially rigid geometrical relation among them. Hence, in the specific example, the potentially valid permutations used in the iteration of stage 601 are $\{1a,2a,3a\}$, $\{1a,2b,3a\}$, $\{1b,2a,3a\}$, $\{1b,2b,3a\}$, $\{1c,2a,3a\}$, $\{1bc,2a,3a\}$.

In stage 602, the exact location of each candidate on the original image is calculated using the precise image scale at which it was located. Thus, although the different template candidates may be located at different image scales, for the purpose of the candidates' relative geometrical position assessment, they must be brought into the same geometric scale. In stage 603, the angles and distance among the candidates in the current permutation are calculated for the purpose of later comparing them to the angles and distances among those templates in the searched object.

As a specific example, FIG. 7 illustrates the relative geometry of $\{1a,2b,3a\}$. Between each of the two template candidates there exists a line segment with specific location, angle and length. In the example in FIG. 7, these are, respectively, element 707 for 1a and 2b, element 708 for 2b and 3a, and element 709 for 1a and 2a.

In stage 604, this comparison is performed by calculating a "score value" for each specific permutation in the example. Continuing with the specific example, the lengths, positions and angles of line segments 707, 708, and 709, are evaluated by some mathematical score function which returns a score value of how similar those segments are to the same segments in the searched object. A simple example of such a score function would be a threshold function. Thus, if the values of the distance and angles of 707, 708, and 709, deviate from the nominal values by a certain amount, the score function will return a 0. If they do not so deviate, then the score function will return a 1. It is clear to those experienced in the art of score function and optimization searches that many different score functions can be implemented, all serving the ultimate goal of identifying cases where the object indeed appears in the image and separating those cases from cases those where the object does not appear in the image.

In stage 605, the score values obtained in all the potential permutations are compared and the maximum score is used to determine if the object does indeed appear in the image. It is also possible, in some embodiments, to use other results and parameters in order to make this determination. For example, an occurrence of too many template candidates (and hence many permutations) might serve as a warning to the algorithm that the object does not indeed appear in the image, or that multiple copies of the object are in the same image.

It should be understood that the reliance on specific templates implies that if those templates are not reliably located in the image, or if the parts of the object belonging to those templates are occluded or distorted in some way (as for example by a light reflection), then in the absence of any workaround, some embodiments invention may not work optimally. A potential workaround for this kind of problem is to use many more templates, thereby improving robustness while increasing the run time of the algorithm.

It should also be understood that some embodiments of the invention are not completely immune to warping of the object. If, for example, the object has been printed on a piece of paper, and that piece of paper is imaged by the user in a significantly warped form, the relative locations and angles of the different template candidates will be also warped and the score function thus may not enable the detection of the object. This is a kind of problem that is likely to appear in physical/printed, as opposed to electronic, media.

It should also be understood that some embodiments of the invention can be combined with other posterior criteria used to ascertain the existence of the object in the image. For example, once in stage 605 the maximum score value exceeds a certain threshold, it is possible to calculate other parameters of the image to further verify the object's existence. One example would be criteria based on the color distribution or texture of the image at the points where presumably the object has been located.

Figure 8:
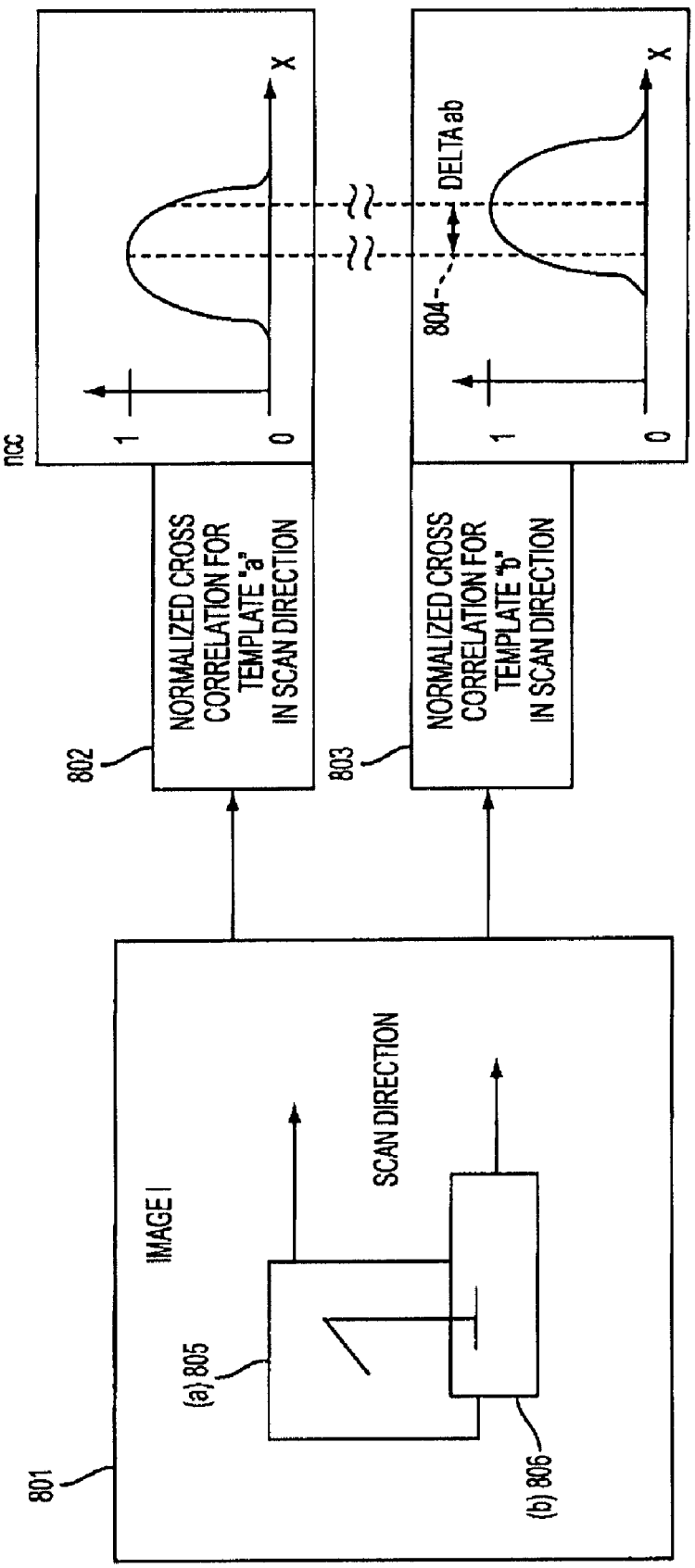
FIG. 8 is an illustration of the method of multiple template matching which is one algorithm used in an exemplary embodiment of the invention.

FIG. 8 illustrates graphically some aspects of the multi-template matching algorithm, which is one important algorithm used in an exemplary embodiment of the present invention (in processing stages 503 and 504). The multi-template matching algorithm is based on the well known template matching method for grayscale images called "Normalized Cross Correlation" (NCC), described in FIG. 2 and in the related prior art discussion. A main deficiency of NCC is that for images with non-uniform lighting, compression artifacts, and/or defocusing issues, the NCC method yields many "false alarms" (that is, incorrect conclusions that a certain status or object appears) and at the same time fails to detect valid objects. The multi-template algorithm described as part of this invention in FIG. 5, extends the traditional NCC by replacing a single template for the NCC operation with a set of N templates, which represent different parts of an object to be located in the image. The templates 805 and 806 represent two potential such templates, representing parts of the digit "1" in a specific font and of a specific size. For each template, the NCC operation is performed over the whole image 801, yielding the normalized cross correlation images 802 and 803. The pixels in these images have values between −1 and 1, where a value of 1 for pixel (x,y) indicates a perfect match between a given template and the area in image 801 centered around (x,y). At the right of 802 and 803, respectively, sample one-dimensional cross sections of those images are shown, showing how a peak of 1 is reached exactly at a certain position for each template. One important point is that even if the image indeed has the object to be searched for centered at some point (x,y), the response peaks for the NCC images for various templates will not necessarily occur at the same point. For example, in the case displayed in FIG. 8, there is a certain difference 804 of several pixels in the horizontal direction between the peak for template 805 and the peak for template 806. These differences can be different for different templates, and the differences are taken into account by the multi-template matching algorithm. Thus, after the correction of these deltas, all the NCC images (such as 802 and 803) will display a single NCC "peak" at the same (x,y) coordinates which are also the coordinates of the center of the object in the image. For a real life image, the values of those peaks will not reach the theoretical "1.0" value, since the object in the image will not be identical to the template. However, proper score functions and thresholds allow for efficient and reliable detection of the object by judicious lowering of the detection thresholds for the different NCC images. It should be stressed that the actual templates can be overlapping, partially overlapping or with no overlap. Their size, relative position, and shape can be changed, as long as the templates continue to correspond to the same object that one wishes to locate in the image. Furthermore, masked NCC, which are well known extension of NCC, can be used for these templates to allow for non-rectangular templates.

As can be understood from the previous discussion, the results of the NCC operation for each sub-template out of N such sub-templates generates a single number per each pixel in the image (x,y). Thus, for each pixel (x,y) there are N numbers which must be combined in some form to yield a score function indicating the match quality. Let us denote by $T^A_i(x,y)$ the value of the normalized cross correlation value of sub-template i of the object "A" at pixel x,y in the image I. A valid score function then could be $f(x,y)=\text{Prod}_{i=1 \ldots N} T^A_i(x,y)$—namely, the scalar product of these N values. Hence for example, if there is a perfect match between the object "A" and the pixels centered at $(x_0,y_0)$ in the image I, then $T^A_i(x_0, y_0)=1.0$ for any i and our score function $f(x,y)=1$ at $\{x=x_0, y=y_0\}$. It is clear to someone familiar with the art of score function design and classification that numerous other score functions could be used, e.g. a weighted average of the N values, or a neural network where the N values are the input, or many others which could be imagined.

Thus, after the application of the chosen score function, the result of the multi-template algorithm is an image identical in size to the input image I, where the value of each pixel (x,y) is the score function indicating the quality of the match between the area centered around this pixel and the searched template.

It is also possible to define a score function for a complete image, indicating the likelihood that the image as a whole contains at least one occurrence of the searched template. Such a score function is used in stages 503 and 504 to determine the optimal image scale. A simple yet effective example of such a score function is $\max_{(x,y)}\{\text{Prod}_{i=1 \ldots N} T^A_i(x,y)\}$ where (x,y) represents the set of all pixels in I. This function would be 1.0 if there is a perfect match between some part of the image I and the searched template. It is clear to someone familiar with the art of score function design, that numerous other score functions could be used, such as, for example, a weighted sum of the values of the local score function for all pixels.

Figure 9:
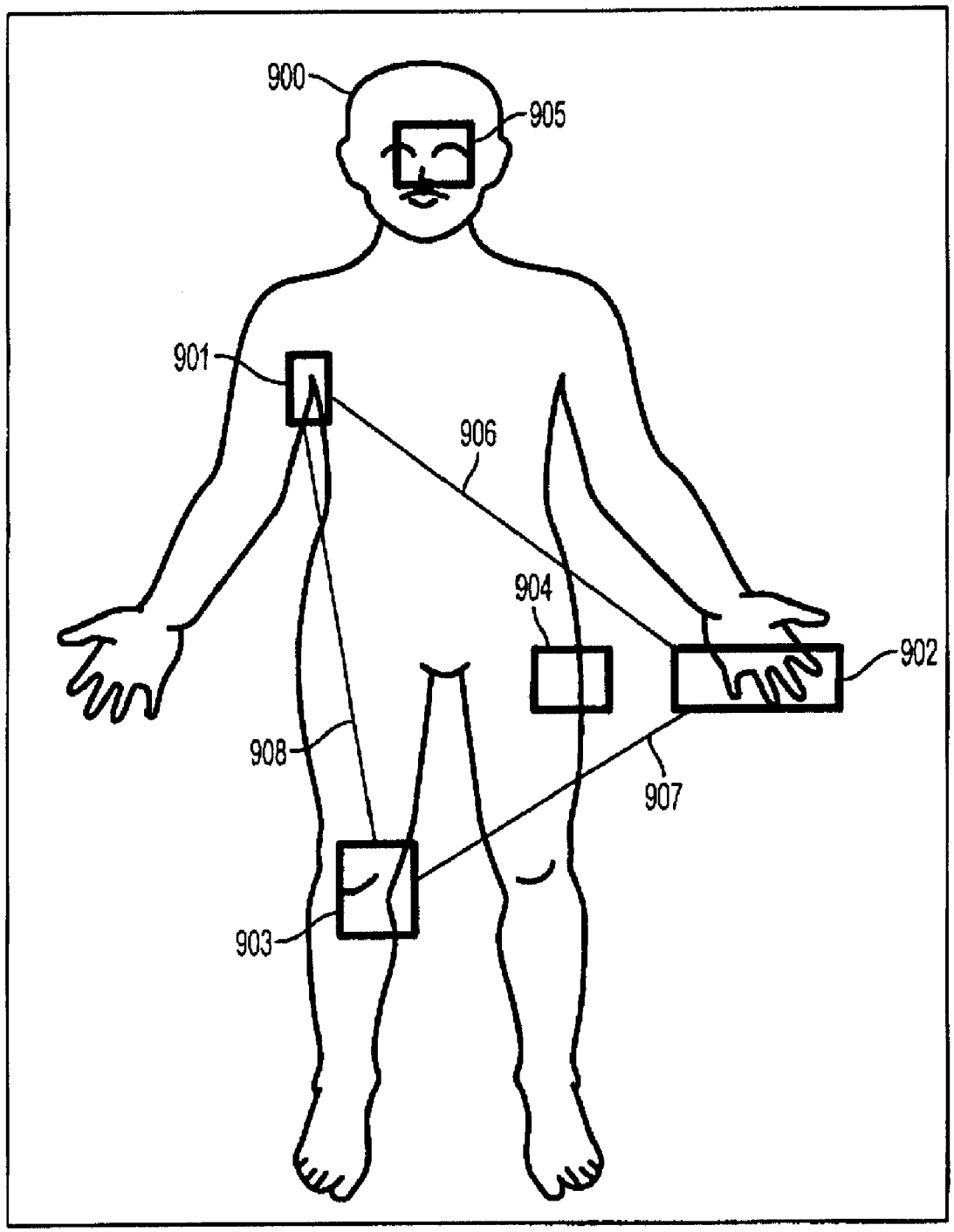
FIG. 9 is an example of an object to be recognized, and of templates of parts of that object which are used in the recognition process.

FIG. 9 illustrates a sample graphic object 900, and some selected templates on it 901, 902, 903, 904, and 905. In one possible application of the present invention, to search for this object in a picture, the three templates 901, 902, and 903, are searched in the image, where each template in itself is searched using the multi-template algorithm described in FIG. 8. After determination of the candidate locations for templates 901, 902, and 903 in FIG. 7 (template 901 candidates are 701, 702, and 703, template 902 candidates are 704 and 705, and template 903 candidate is 706), the relative distances and angles for each potential combination of candidates (one for each template, e.g. {701, 705, 706}) are compared to the reference distances and angles denote by line segments 906, 907, and 908. Some score function is used to calculate the similarity between line segments 707, 708, and 709 on the one hand, and line segments 906, 907, and 908 on the other hand. Upon testing all potential combinations (or a subset thereof), the best match with the highest score is used in stage 507 to determine whether indeed the object in the image is our reference object 900.

It is clear to someone familiar with the art of object recognition that the reliability, run time, and hit/miss ratios of the algorithm described in this invention can be modified based on the number of different templates used, their sizes, the actual choice of the templates, and the score functions. For example, by employing all five templates 901, 902, 903, 904, and 905, instead of just three templates, the reliability of detection would increase, yet the run time would also increase. Similarly, template 904 would not be an ideal template to use for image scale determination or for object search in general, since it can yield a good match with many other parts of the searched object as well as with many curved lines which can appear in any image. Thus, the choice of optimal templates can be critical to reliable recognition using a minimum number of templates (although adding a non-optimal template such as 904 to a list of templates does not inherently reduce the detection reliability).

It is also clear from the description of the object search algorithm, that with suitably designed score functions for stages 505 and 506, it is possible to detect an object even if one or more of the searched templates are not located in the image. This possibility enables the recognition of objects even in images where the objects are partially occluded, weakly illuminated, or covered by some other non-relevant objects. Some specific practical examples of such detection include the following:

EXAMPLE 1

When imaging a CRT display, the exposure time of the digital imaging device coupled to the refresh times of the screen can cause vertical banding to appear. Such banding cannot be predicted in advance, and thus can cause part of the object to be absent or to be much darker than the rest of the object. Hence, some of the templates belonging to such an object may not be located in the image. Additionally, the banding effect can be reduced significantly by proper choices of the colors used in the object and in its background.

EXAMPLE 2

During the encoding and communication transmission stages between components 304 and 305, errors in the transmission or sub-optimal encoding and compression can cause parts of the image of the object to be degraded or even completely non-decodable. Therefore, some of the templates belonging to such an object may not be located in the image.

EXAMPLE 3

When imaging printed material in glossy magazines, product wrappings or other objects with shiny surfaces, some parts of the image may be saturated due to reflections from the surrounding light sources. Thus in those areas of the image it may be impossible or very hard to detect object features and templates. Therefore, some of the templates belonging to such an object may not be located in the image.

Hence, the recognition method and system outlined in the present invention, along with other advantages, enable increased robustness to such image degradation effects.

Another important note is that embodiments of the present invention as described here allows for any graphical object—be it alphanumeric, a drawing, a symbol, a picture, or other, to be recognized. In particular, even machine readable codes can be used as objects for the purpose of recognition. For example, a specific 2D barcode symbol defining any specific URL, as for example the URL http://www.dspv.net, could be entered as an object to be searched.

Since different potential objects can be recognized using the present invention, it is also possible to use animations or movies where specific frames or stills from the animation or movie are used as the reference objects for the search. For example, the opening shot of a commercial could be used as a reference object, where the capturing of the opening shot of the image indicates the user's request to receive information about the products in this commercial.

The ability to recognize different objects also implies that a single logo with multiple graphical manifestations can be entered in the authentication and processing server's 306 database as different objects all leading to a unified service or content. Thus, for example, all the various graphical designs of the logo of a major corporation could be entered to point to that corporation's web site.

By establishing a communication link based on visual information between a display or printed matter 302 and a portable imaging device (which is one embodiment of imaging device 303), embodiments of the present invention enable a host of different applications in addition to those previously mentioned in the prior discussion. Some examples of such applications are:

Product Identification for price comparison/information gathering: The user sees a product (such as a book) in a store, with specific graphics on it (e.g., book cover). The user takes a picture/video of the identifying graphics on the product. Based on code/name/graphics of the product, the user receives information on the price of this product, its features, its availability, information to order it, etc.

URL launching. The user snaps a photo of some graphic symbol (e.g., a company's logo) and later receives a WAP PUSH message for the relevant URL.

Prepaid card loading or purchased content loading. The user takes a photo of the recently purchased pre-paid card, and the credit is charged to his/her account automatically. The operation is equivalent to currently inputting the prepaid digit sequence through an IVR session or via SMS, but the user is spared from actually reading the digits and typing them one by one.

Status inquiry based on printed ticket: The user takes a photo of a lottery ticket, a travel ticket, etc., and receives back the relevant information, such as winning status, flight delayed/on time, etc. The graphical and/or alphanumeric information on the ticket is decoded by the system, and hence triggers this operation.

User authentication for Internet shopping: When the user makes a purchase, a unique code is displayed on the screen and the user snaps a photo, thus verifying his identity via the phone. Since this code is only displayed at this time on this specific screen, the photo taken by the user represents a proof of the user's location, which, coupled to the user's phone number, create reliable location-identity authentication.

Location Based Coupons: The user is in a real brick and mortar store. Next to each counter, there is a small sign/label with a number/text on it. The user snaps a photo of the label and gets back information, coupons, or discounts relevant to the specific clothes items (jeans, shoes, etc.) in which he is interested. The label in the store contains an ID of the store and an ID of the specific display the user is next to. This data is decoded by the server and sent to the store along with the user's phone ID.

Digital signatures for payments, documents, or identities. A printed document (such as a ticket, contract, or receipt) is printed together with a digital signature (such as a number with 20-40 digits) on it. The user snaps a photo of the document and the document is verified by a secure digital signature printed in it. A secure digital signature can be printed in any number of formats, such as, for example, a 40-digit number, or a 20-letter word. This number can be printed by any printer. This signature, once converted again to numerical form, can securely and precisely serve as a standard, legally binding digital signature for any document.

Catalog ordering/purchasing: The user is leafing through a catalogue. He snaps a photo of the relevant product with the product code printed next to it, and this action is equivalent to an "add to cart operation". The server decodes the product code and the catalogue ID from the photo, and then sends the information to the catalogue company's server, along with the user's phone number.

Business Card exchange: The user snaps a photo of a business card. The details of the business card, possibly in VCF format, are sent back to the user's phone. The server identifies the phone numbers on the card, and using the carrier database of phone numbers, identifies the contact details of the relevant cellular user. These details are wrapped in the proper "business card" format and sent to the user.

Coupon Verification: A user receives to his phone, via SMS, MMS, or WAP PUSH, a coupon. At the POS terminal (or at the entrance to the business using a POS terminal) he shows the coupon to an authorized clerk with a camera phone, who takes a picture of the user's phone screen to verify the coupon. The server decodes the number/string displayed on the phone screen and uses the decoded information to verify the coupon.

What is claimed is:

1. A method for recognizing symbols and identifying users or services, the method comprising:
    displaying an image or video clip on a display device in which identification information is embedded in the image or video clip;
    capturing the image or video clip on an imaging device;
    transmitting the image or video clip from the imaging device to a communication network;
    transmitting the image or video clip from the communication network to a processing and authentication server;
    processing the information embedded in the image or video clip by the server to identify logos, alphanumeric characters, or special symbols in the image or video clip, and converting the identified logos or characters or symbols into a digital format to identify the user or location of the user or service provided to the user;
    wherein the display device further displays additional information which identifies the type or location of the display device;
    wherein said embedded identification information in the image or video clip is the original image or video clip in which no modification has been made to the image or video clip for the purpose of enabling machine recognition of said embedded identification information.

2. The method of claim 1, wherein:
    said embedded identification information is wholly or partially in an electronic format.

3. The method of claim 2, further comprising identifying the user of the service based on said electronic information.

4. The method of claim 2, further comprising when the service is provided, identifying the location of the user based on said digital format.

5. The method of claim 2, further comprising identifying the location at which the service is provided to the user based on said digital format.

6. The method of claim 2, wherein:
    the additional information displayed by the display device identifies the type of display device used by the user.

7. The method of claim 2, wherein:
    the additional information displayed by the display device identifies a physical location of the display device at the time the service is provided to the user.

8. The method of claim 2, wherein:
    the additional information displayed by the display device identifies an IP address of the display device at the time the service is provided to the user.

9. The method of claim 2, wherein:
    the embedded information is a logo.

10. The method of claim 2, wherein:
    the nature or character of the image or video clip serves as all or part of the identifying information.

11. The method of claim 2, wherein:
    the embedded information is a signal that is spatially or temporally modulated on the screen of the display device.

12. The method of claim 2, wherein
    the embedded information is alphanumeric characters.

13. The method of claim 2, wherein:
    the embedded information is a bar code.

14. The method of claim 2, wherein:
    the embedded information is a sequence of signals which are not human readable but which are machine readable.

15. The method of claim 2, wherein:
    the communication network is a wireless network.

16. The method of claim 2, wherein:
    the communication network is a wireline network.

17. The method of claim 1, wherein:
    said embedded identification information is in wholly or partially in a non-electronic format.

18. The method of claim 17, further comprising identifying the user of the service based on said non-electronic format.

19. The method of claim 17, further comprising when the service is provided, identifying the location of the user based on said non-electronic format.

20. The method of claim 17, further comprising identifying the location at which the service is provided to the user based on said non-electronic format.

21. The method of claim 17, wherein:
    the additional information displayed by the display device identifies the type of display device used by the user.

22. The method of claim 17, wherein:
    the additional information displayed by the display device identifies a physical location of the display device at the time the service is provided to the user.

23. The method of claim 17, wherein:
    the embedded information is a logo.

24. The method of claim 17, wherein:
    the nature or character of the image serves as all or part of the identifying information.

25. The method of claim 17, wherein:
    the embedded information is a signal that is spatially or temporally modulated on the screen of the display device.

26. The method of claim 17, wherein
    the embedded information is alphanumeric characters.

27. The method of claim 17, wherein:
the embedded information is a bar code.
28. The method of claim 17, wherein:
the embedded information is a sequence of signals which are not human readable but which are machine readable.
29. The method of claim 17, wherein:
the communication network is a wireless network.
30. The method of claim 17, wherein:
the communication network is a wireline network.
31. The method claim 1, wherein:
the original of said image or video clip is the embedded identification information, with no additional marks, barcodes, watermarks, or other codes added to said image or video clip.
32. The method of claim 31, wherein:
said embedded identification information is wholly or partially in a digital format.
33. The method of claim 1, wherein:
said imaging device transmits information about the imaging device to the communication network;
the communication network processes the information about the imaging device to determine the identity of the imaging device; and
the communication network processes the information about the imaging device to determine the location of the imaging device.
34. The method of claim 33, wherein:
the information about the imaging device processed to determine the identity of the imaging device is an IMEI number of the imaging device.
35. The method of claim 33, wherein:
the information about the imaging device processed to determine the identity of the imaging device is a MSISDN number of the imaging device.
36. The method of claim 33, wherein:
the information about the imaging device processed to determine the location of the imaging device is coordinates from a location based system of the imaging device.
37. The method of claim 36, wherein:
the location based system is a global positioning system (GPS).
38. The method of claim 2, wherein:
said image or video clip is one or more pictures.
39. The method of claim 38, wherein:
said embedded identification information is information for identification of a product.
40. The method of claim 38, wherein:
said embedded identification information is information for identification of a person.
41. The method of claim 1, wherein:
said image or video clip is one or more graphic images.
42. The method of claim 41, wherein:
said embedded identification information is information for identification of a product.
43. The method of claim 41, wherein:
said embedded identification information is information for identification of a person.
44. The method of claim 1, further comprising identifying a product based on the results of said processing of information.
45. The method of claim 44, wherein:
said identification of product is used as a part of an information gathering to compare a plurality of products.
46. The method of claim 45, wherein:
said comparison is a comparison of prices among a plurality of products.
47. The method of claim 1, further comprising loading a card with financial credit based on the results of said processing of information.
48. The method of claim 1, further comprising determining status of a printed ticket based the results of said processing of information.
49. The method of claim 48, wherein:
said status informs a user whether the card has won a prize.
50. The method of claim 48, wherein:
said status informs a user whether a particular transportation carrier is on time or delayed.
51. The method of claim 1, further comprising authenticating the identity of the user in order to allow the user to perform Internet shopping based on the results of said processing of information.
52. The method of claim 1, further comprising receiving purchase information related to a specific retail location based on the results of said processing of information.
53. The method of claim 52, wherein:
said purchase information is coupons that grant the user a purchase discount of an item at said specific retail location.
54. The method of claim 1, wherein:
said processing of information comprises processing of a digital signature that is embedded in the information processed.
55. The method of claim 54, further comprising identifying a particular user based on said digital signature.
56. The method of claim 55, wherein:
said digital signature is used as a legally binding signature for a particular writing.
57. The method of claim 1, wherein:
said processing of information comprises generating a purchase order from a written offer to sell.
58. The method of claim 57, wherein:
the written offer to sell is a product brochure or product catalog.
59. The method of claim 57, wherein:
said purchase order is sent by the communication network to an entity making the written offer to sell.
60. The method of claim 58, wherein:
said purchase order is sent by the communication network to an entity making the written offer to sell.
61. The method of claim 1, wherein:
said information processed is the information that appears on a business card.
62. The method of claim 1, further comprising verifying a purchase coupon based the results of said processing of information.
63. The method of claim 1, wherein:
said image or video clip is transmitted using Multimedia Messaging System (MMS) protocol.
64. The method of claim 1, wherein:
said image or video clip is transmitted using a video-calling protocol.

* * * * *